(No Model.)
C. E. SCRIBNER.
TELEPHONE CIRCUIT.
No. 584,417. Patented June 15, 1897.
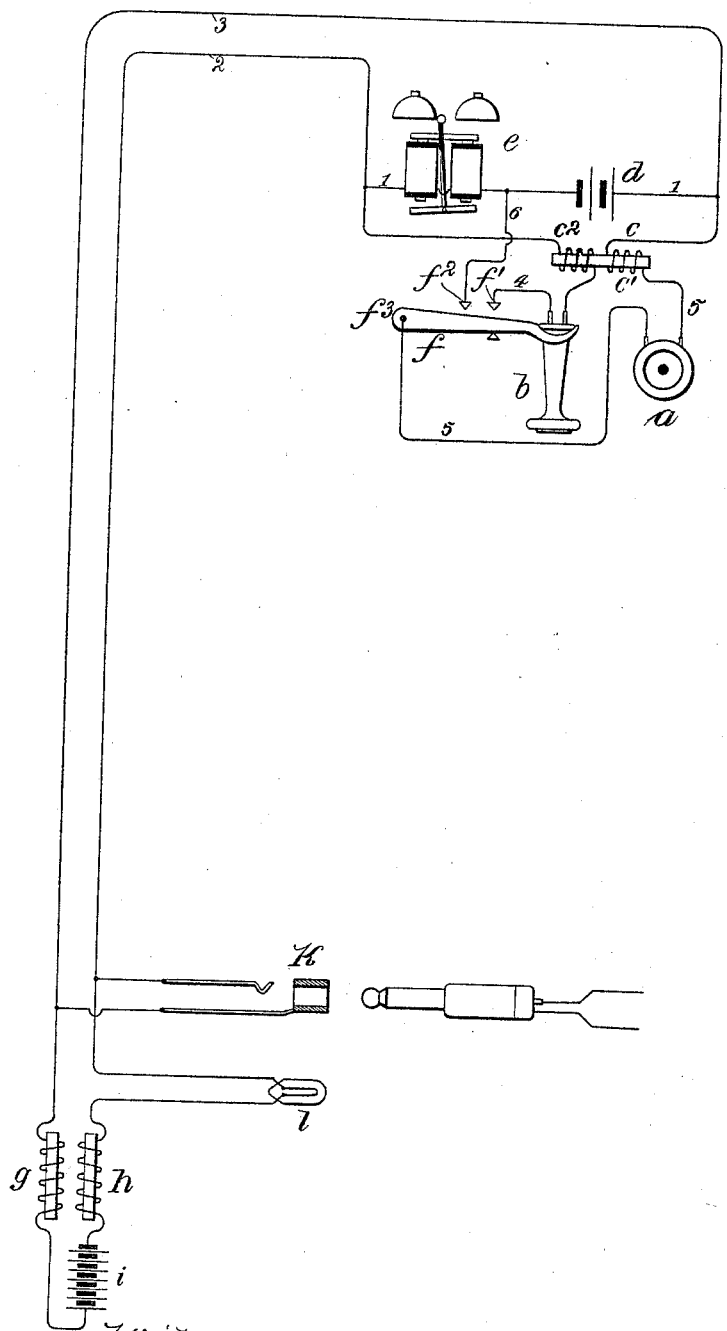
Witnesses:
Dr. Witt C. Tanner,
John W. Sinclair.
Inventor:
Charles E. Scribner
By Barton & Brown
Attorneys.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TELEPHONE-CIRCUIT.

SPECIFICATION forming part of Letters Patent No. 584,417, dated June 15, 1897.

Application filed November 4, 1895. Serial No. 567,839. (No model.)

*To all whom it may concern:*

Be it known that I, CHARLES E. SCRIBNER, a citizen of the United States, residing at Chicago, in the county of Cook and State of Illinois, have invented a certain new and useful Improvement in Telephone-Circuits, (Case No. 407,) of which the following is a full, clear, concise, and exact description, reference being had to the accompanying drawing, forming a part of this specification.

My invention concerns the arrangement of apparatus at telephone-substations at which the transmitting-telephones are supplied with exciting-current from storage batteries at the stations, the batteries being charged by currents constantly flowing in the lines from a central source while the telephones are not in use.

It consists in a new arrangement of the circuit connections of the station appliances designed to permit a different mode of operating the telephones in the event of the complete discharge of the local storage battery to avoid interruption of service, and serving incidentally to simplify the circuits.

When a storage battery is nearly or quite discharged or, if it be of the Planté type, is unformed, its electromotive force will be insufficient for properly exciting a transmitting-telephone; but if current be sent through the battery in the direction to charge it a considerable counter electromotive force is instantly developed nearly equal to that of the charged cell. When a current is permitted to flow in the telephone-line during the use of the line, this action of the discharged storage-cell may be utilized to divert current through the transmitting instrument for its operation, the efficiency of transmission under such circumstances being favorably comparable with that experienced when the charged cell is used. This action of the uncharged battery in the circuit and its use in operating a telephone-transmitter have been described in and made the subject of a prior application, Serial No. 547,624, filed April 30, 1895, (Case No. 385.) In that application I have denominated the cells so used "polarization-cells" and will hereinafter employ the same term in this specification.

The station equipment to which the present application relates is intended particularly for use in association with a system of signals which requires the presence of a considerable current in the telephone-line during its use for conversation.

The invention consists in so arranging the different appliances at the station that the local storage battery may be in position to receive the required charging-current during the idleness of the line and to discharge through the local circuit of the transmitting-telephone during the use of this instrument as long as the battery is properly charged, but that it may act as a polarization-cell to divert current from the line through the same local-transmitter circuit when nearly or quite discharged. This contrivance greatly diminishes the danger of interruption of the service from failure of the exciting-current. While the local storage battery is charged the normal efficiency of transmission will be obtained; but in case of complete discharge of the local battery from any of several causes which may operate transmission may still be satisfactorily effected, although with somewhat less efficiency than before. The new arrangement of circuits has also some other advantages, chief among which is its simplicity.

The invention is shown in the accompanying drawing.

The telephonic appliances at the substation comprise a transmitting-telephone $a$, a receiving-telephone $b$, an induction-coil $c$, and a storage battery $d$ of two cells. In addition to these a signal-bell $e$ of high resistance is placed at the station, and a telephone-switch $f$, which controls the continuity of the telephone-circuits. This switch $f$ is provided with two contact-points $f'$ and $f^2$, with which it makes contact when the lever $f^3$ of the switch is permitted to rise.

The storage battery $d$ and the high-resistance bell $e$ are included serially in a bridge or cross connection 1 of the line-circuit 2 3. The receiving-telephone and the secondary helix $c^2$ of the induction-coil $c$ are placed in a branch 4 from line conductor 2, terminating in the contact-anvil $f'$ of the switch. The transmitting-telephone $a$ and the primary winding $c'$ of coil $c$ are in a branch 5 from line conductor 2, terminating in the lever $f^3$ of the switch. A wire 6 is led from bridge 1 intermediate of the battery and bell to the contact-anvil $f^2$ of the switch.

It will be observed that there are thus a permanently-closed bridge 1 of the line-circuit containing the bell and the battery, a normally open bridge of the circuit controlled by the switch, including wire 4, a secondary helix of the induction-coil, the receiving-telephone, switch-contacts $f'\,f^2$, wire 6, and a portion of wire 1, and a normally open local circuit about battery $d$, made up of a portion of wire 1, wire 5, including the transmitting-telephone and the primary helix of the induction-coil, switch-lever $f^3$, contact $f^2$, and wire 6. When the receiving-telephone is removed from its support, the switch closes the branch containing the receiving-telephone and completes also the local circuit about battery $d$.

The line conductors may be led at the exchange through impedance-coils $g$ and $h$ to the poles of a central charging-battery $i$. A spring-jack $k$ is shown connected with the line and a lamp-signal $l$ is included in line conductor 2 and placed near the spring-jack.

The battery $i$ creates in the line a current which circulates, while the line is not in use, through the local storage battery $d$ and the bell $e$ at the substation. The local battery is thus continuously receiving a charging-current, which may in practice amount to two-hundredths of an ampere.

When the receiving-telephone $b$ at the substation is brought into use, a low-resistance path is formed through this instrument, whereby sufficient current is permitted to flow in the line to illuminate the lamp $l$ and give the signal. The local circuit of battery $d$ is now closed through the transmitting-telephone and the induction-coil, so that conversation may be carried on by means of the transmitter.

If the storage battery $d$ be fully charged, it will supply a current of maximum voltage and volume to the transmitting-telephone and permit the transmission of telephonic currents with the highest efficiency. If, however, the battery be nearly or quite discharged from excessive use or from any other cause, the current which tends to flow from the central charging-battery $i$ through the line-circuit and through battery $d$, wire 6, and receiving-telephone $b$ will excite a considerable counter electromotive force in the battery, by which a large portion of the current will be diverted through the transmitting-telephone $a$ and the primary winding of the induction-coil. Conversation will thus still be possible as long as current is maintained in the line-circuit from the central battery.

I claim as my invention—

The combination with a telephone-line, of a central supply-battery in connection therewith, a bell and a storage battery permanently connected serially in the line at the substation thereof, an induction-coil, a receiving-telephone in circuit with the secondary winding thereof, a transmitting-telephone in circuit with the primary winding thereof, a switch, and circuit connections controlled by the switch adapted to bring the receiving-telephone and secondary winding of the induction-coil into shunt of the bell, and the transmitting-telephone and the primary winding of the induction-coil into shunt of the battery, as described.

In witness whereof I hereunto subscribe my name this 17th day of September, A. D. 1895.

CHARLES E. SCRIBNER.

Witnesses:
ELLA EDLER,
LUCILE RUSSELL.